United States Patent
Yoon et al.

(10) Patent No.: US 9,824,819 B2
(45) Date of Patent: Nov. 21, 2017

(54) DIELECTRIC CERAMIC COMPOSITION AND MULTILAYER CERAMIC CAPACITOR INCLUDING THE SAME

(71) Applicant: SAMSUNG ELECTRO-MECHANICS CO., LTD., Suwon-Si, Gyeonggi-Do (KR)

(72) Inventors: Seok Hyun Yoon, Suwon-Si (KR); Yun Jung Park, Suwon-Si (KR); Doo Young Kim, Suwon-Si (KR); Song Je Jeon, Suwon-Si (KR); Chang Hoon Kim, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/925,546

(22) Filed: Oct. 28, 2015

(65) Prior Publication Data

US 2016/0163457 A1     Jun. 9, 2016

(30) Foreign Application Priority Data

Dec. 8, 2014     (KR) .................. 10-2014-0175016

(51) Int. Cl.
    *C04B 35/468*     (2006.01)
    *H01G 4/12*     (2006.01)
    (Continued)

(52) U.S. Cl.
    CPC ........... *H01G 4/1227* (2013.01); *B32B 18/00* (2013.01); *C04B 35/4682* (2013.01);
    (Continued)

(58) Field of Classification Search
    CPC ............. C04B 35/4682; C04B 35/475; H01L 41/1871; H01L 41/1873; H01L 41/1878
    See application file for complete search history.

(56) References Cited

U.S. PATENT DOCUMENTS 7,742,278 B2 *    6/2010    Takeda ................ C04B 35/4682
                                                               361/301.4
8,791,625 B2 *    7/2014    Kounga Njiwa ..... C04B 35/462
                                                               252/62.9 PZ (Continued)

FOREIGN PATENT DOCUMENTS

JP     2007246347     *    9/2007
JP     2011-173776 A       9/2011

(Continued)

OTHER PUBLICATIONS

Zhang et al "Giant strain in lead-free piezoceramics Bi.5Na.5TiO3-BaTiO3-K.5Na.5NbO3" Applied Physics Letters 91 1129061-3, 2007.*

(Continued)

*Primary Examiner* — Karl Group
(74) *Attorney, Agent, or Firm* — McDermott Will & Emery LLP

(57) ABSTRACT

There is provided a dielectric ceramic composition including a base powder, wherein the base powder includes: a first major component represented by $BaTiO_3$, a second major component represented by $(Na, K)NbO_3$, and a third major component represented by $(Bi, Na)TiO_3$. The base powder is represented by $xBaTiO_3-y(Na, K)NbO_3-z(Bi, Na)TiO_3$, where $x+y+z=1$, and x, y, and z are represented by mol, and x, y and z satisfy $0.5 \leq x \leq 0.97$, $0.01 \leq y \leq 0.48$, and $0.02 \leq z \leq 0.2$, respectively. In certain embodiments, the base powder is be represented by $xBaTiO_3-y(Na_{0.5}K_{0.5})NbO_3-z(Bi_{0.5}Na_{0.5})TiO_3$.

9 Claims, 2 Drawing Sheets

(51) Int. Cl.
  *B32B 18/00* (2006.01)
  *C04B 35/626* (2006.01)
  *H01G 4/30* (2006.01)

(52) U.S. Cl.
  CPC .... *C04B 35/6261* (2013.01); *C04B 35/62685* (2013.01); *C04B 2235/32* (2013.01); *C04B 2235/3201* (2013.01); *C04B 2235/3215* (2013.01); *C04B 2235/3239* (2013.01); *C04B 2235/3244* (2013.01); *C04B 2235/3251* (2013.01); *C04B 2235/3267* (2013.01); *C04B 2235/3298* (2013.01); *C04B 2235/3418* (2013.01); *C04B 2235/36* (2013.01); *C04B 2235/5445* (2013.01); *C04B 2235/6025* (2013.01); *C04B 2235/6582* (2013.01); *C04B 2237/346* (2013.01); *C04B 2237/68* (2013.01); *C04B 2237/704* (2013.01); *H01G 4/30* (2013.01)

(56) References Cited

U.S. PATENT DOCUMENTS

| | | | |
|---|---|---|---|
| 2006/0006360 A1* | 1/2006 | Takao | C04B 35/495 252/62.9 R |
| 2007/0152183 A1* | 7/2007 | Furukawa | C04B 35/495 252/62.9 R |
| 2010/0085681 A1 | 4/2010 | Takeda | |
| 2010/0187466 A1* | 7/2010 | Wang | C01G 33/006 252/62.9 PZ |
| 2012/0098386 A1* | 4/2012 | Kounga Njiwa | C04B 35/462 310/311 |
| 2013/0083450 A1* | 4/2013 | Yoon | H01G 4/30 361/321.4 |

FOREIGN PATENT DOCUMENTS

| | | |
|---|---|---|
| KR | 1999-0075846 A | 10/1999 |
| KR | 10-2010-0008380 A | 1/2010 |

OTHER PUBLICATIONS

Zhang et al "Lead-free piezoceramics with giant strain in the cubic system Bi.5Na.5TiO3-BaTiO3-K.5Na.5NbO3" XP002577082 Journal Applied Physics 103 p. 1-8 2008.*

* cited by examiner

DIELECTRIC CERAMIC COMPOSITION AND MULTILAYER CERAMIC CAPACITOR INCLUDING THE SAME

CROSS-REFERENCE TO RELATED APPLICATION

This application claims the benefit of Korean Patent Application No. 10-2014-0175016 filed on Dec. 8, 2014, with the Korean Intellectual Property Office, the disclosure of which is incorporated herein by reference.

BACKGROUND

The present disclosure relates to a novel dielectric ceramic composition satisfying X9R temperature characteristics as well as having guaranteed reliability, and a multilayer ceramic capacitor including the same.

In general, electronic components using a ceramic material such as capacitors, inductors, piezoelectric elements, varistors, and thermistors include a ceramic body formed of the ceramic material, internal electrodes formed within the ceramic body, and external electrodes disposed on a surface of the ceramic body and connected to the internal electrodes.

Among ceramic electronic components, multilayer ceramic capacitors (MLCCs) include a plurality of stacked dielectric layers and internal electrodes. The internal electrodes are disposed to face each other with at least one of the dielectric layers being interposed therebetween, and the external electrodes are electrically connected to the internal electrodes.

MLCCs, having advantages such as compactness, high capacitance, and ease of mountability, are commonly used as components in mobile communications devices, such as computers, personal digital assistants (PDAs), and cellular phones.

MLCCs are generally manufactured by stacking layers of paste for internal electrodes and layers of paste for dielectric layers using a sheet formation method or a printing method, and simultaneously sintering the laminate.

A dielectric material used for a related art high-capacity multilayer ceramic capacitor, or the like, is a ferroelectric material based on barium titanate ($BaTiO_3$) having a high degree of permittivity at room temperature, a relatively low dissipation factor, and excellent insulation resistance properties.

However, such a dielectric material based on barium titanate ($BaTiO_3$) is inadequate to satisfy X8R characteristics, capacitance temperature characteristics up to 150° C., and to guarantee reliability.

Considerable research has been conducted into methods for satisfying X8R characteristics, including capacitance temperature characteristics up to 150° C., and guaranteeing reliability, but research into a method for satisfying temperature characteristics in a region of 150° C. or higher has rarely been carried out.

Thus, a dielectric material able to satisfy X9R temperature characteristics in a region higher than 150° C., such as, up to 175° C., with improved reliability, needs to be researched.

SUMMARY

An aspect of the present disclosure provides a novel dielectric ceramic composition satisfying X9R temperature characteristics and having guaranteed reliability, and a multilayer ceramic capacitor (MLCC) including the same.

According to an aspect of the present disclosure, a dielectric ceramic composition includes a base powder including: a first major component represented by $BaTiO_3$, a second major component represented by $(Na, K)NbO_3$, and a third major component represented by $(Bi, Na)TiO_3$.

The base powder may be represented by $xBaTiO_3$-$y(Na, K)NbO_3$-$z(Bi, Na)TiO_3$, where $x+y+z=1$, and x, y, and z are represented by mol, and x, y and z satisfy $0.5 \leq x \leq 0.97$, $0.01 \leq y \leq 0.48$, and $0.02 \leq z \leq 0.2$, respectively. In certain embodiments, the base powder is represented by $xBaTiO_3$-$y(Na_{0.5}K_{0.5})NbO_3$-$z(Bi_{0.5}Na_{0.5})TiO_3$.

According to another aspect of the present disclosure, a multilayer ceramic capacitor includes a ceramic body in which dielectric layers and first and second internal electrodes are alternately stacked. First and second external electrodes are disposed on both end portions of the ceramic body and electrically connected to the first and second internal electrodes, respectively. The dielectric layers include a dielectric ceramic composition including a base powder including a first major component represented by $BaTiO_3$, a second major component represented by $(Na, K)NbO_3$, and a third major component represented by $(Bi, Na)TiO_3$, and a minor component.

The base powder may be represented by $xBaTiO_3$-$y(Na, K)NbO_3$-$z(Bi, Na)TiO_3$, where $x+y+z=1$, x, y, and z are represented by mol, and x, y and z satisfy $0.5 \leq x \leq 0.97$, $0.01 \leq y \leq 0.48$, and $0.02 \leq z \leq 0.2$. In certain embodiments, the base powder is represented by $xBaTiO_3$-$y(Na_{0.5}K_{0.5})NbO_3$-$z(Bi_{0.5}Na_{0.5})TiO_3$.

According to another aspect of the disclosure, a dielectric ceramic composition is provided comprising a base powder. The base powder comprises: a first major component X having a Curie temperature of about 125° C., a second major component Y having a Curie temperature of about 450° C. or higher, and a third major component Z having a Curie temperature of about 320° C. or higher. The base powder is represented by $xX$-$yY$-$zZ$, where $x+y+z=1$; x, y, and z are represented by mol; and X and Z are titanates and Y is a niobate.

According to another aspect of the disclosure, a multilayer ceramic capacitor is provided. The multilayer ceramic capacitor includes a ceramic body in which dielectric layers and first and second internal electrodes are alternately stacked, and first and second external electrodes disposed on both end portions of the ceramic body and electrically connected to the first and second internal electrodes. The dielectric layers include a dielectric ceramic composition comprising a first major component X having a Curie temperature of about 125° C., a second major component Y having a Curie temperature of about 450° C. or higher, and a third major component Z having a Curie temperature of about 320° C. or higher. The multilayer ceramic capacitor has: a temperature coefficient of capacitance of within +/−15% in a temperature range of −55° C. to 175° C., a room temperature permittivity of greater than 1000, a withstand voltage of at least 50 V/μm at 150° C., and a room temperature resistivity of greater than 7.420E+10.

According to another aspect of the disclosure, a method of forming a dielectric ceramic composition including a base powder is provided, comprising steps of mixing $BaCO_3$ and $TiO_2$ to form a first mixture and calcining the first mixture at a temperature in a range of 900° C. to 1000° C. to form $BaTiO_3$. $Na_2O$, $K_2O$, and $Nb_2O_3$ are mixed to form a second mixture, and the second mixture is calcined at a temperature in a range of 800° C. to 900° C. to form $(Na_{0.5}K_{0.5})NbO_3$. $Bi_2O_3$, $Na_2CO_3$, and $TiO_2$ are mixed to form a third mixture, and the third mixture is calcined at a temperature in a range of 800° C. to 900° C. to form $(Bi_{0.5}Na_{0.5})TiO_3$. The $BaTiO_3$, $(Na_{0.5}K_{0.5})NbO_3$, and $(Bi_{0.5}Na_{0.5})TiO_3$ are mixed to form the base powder.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
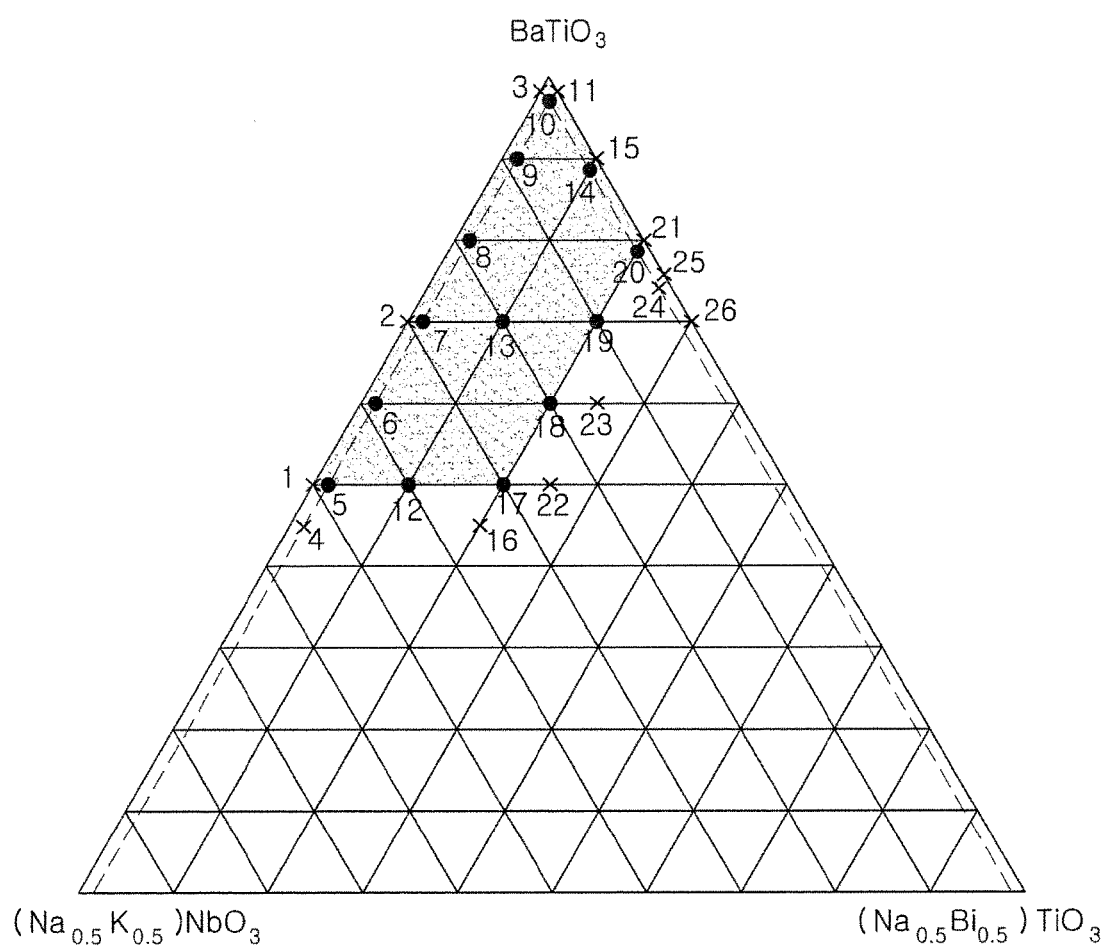
FIG. 1 is a graph illustrating composition regions of major components of a base powder are represented by $xBaTiO_3$-$y(Na_{0.5}K_{0.5})NbO_3$-$z(Bi_{0.5}Na_{0.5})TiO_3$.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric ceramic composition. Examples of electronic components including the dielectric ceramic composition may include capacitors, inductors, piezoelectric elements, varistors, and thermistors.

Hereinafter, the dielectric ceramic composition and a multilayer ceramic capacitor (MLCC) including the same will be described merely as an exemplary electronic component, without particular limitation.

The dielectric ceramic composition according to an embodiment of the present disclosure includes a base powder including a first major component represented by $BaTiO_3$, a second major component represented by $(Na, K)NbO_3$, and a third major component represented by $(Bi, Na)TiO_3$, and a minor component.

The dielectric ceramic composition according to an embodiment of the present disclosure may satisfy X5R (−55° C.~85° C.), X7R (−55° C.~125° C.), X8R (−55° C.~150° C.), and X9R (−55° C.~175° C.) characteristics defined in standards set by the Electronic Industries Alliance (EIA).

In detail, according to an embodiment of the present disclosure, a dielectric ceramic composition sintered under a reduction atmosphere in which nickel (Ni) is used as a material for internal electrodes is not oxidized at a temperature of 1300° C. or lower.

In addition, the present disclosure provides an MLCC using the dielectric ceramic composition to satisfy the aforementioned temperature characteristics and have excellent reliability.

Hereinafter, components of the dielectric ceramic composition according to an embodiment of the present disclosure will be described in detail.

a) Base Powder

A dielectric ceramic composition according to certain embodiments include a base powder including a first major component represented by $BaTiO_3$, a second major component represented by $(Na, K)NbO_3$, and a third major component represented by $(Bi, Na)TiO_3$.

The first major component represented by $BaTiO_3$, may be a material used in a general dielectric base material and may be a ferroelectric material having a Curie temperature of about 125° C.

The second major component represented by $(Na, K)NbO_3$, may be represented by $(Na_{0.5}K_{0.5})NbO_3$, but is not limited thereto. $(Na_{0.5}K_{0.5})NbO_3$ may be a material having ferroelectricity at room temperature and having a significantly high Curie temperature of about 450° C. or higher.

The third major component represented by $(Bi, Na)TiO_3$, may be represented by $(Bi_{0.5}Na_{0.5})TiO_3$, but is not limited thereto. $(Bi_{0.5}Na_{0.5})TiO_3$ may be a material having ferroelectricity at room temperature and having a significantly high Curie temperature of about 320° C. or higher.

That is, the base powder of the dielectric ceramic composition may have the form of a mixture in which the $BaTiO_3$ ferroelectric material having a low Curie temperature and the ferroelectric material having a high Curie temperature are mixed at a predetermined ratio.

Since the base powder is prepared by mixing the material having a low Curie temperature and the material having a high Curie temperature at a predetermined ratio, permittivity is high at room temperature, insulation resistance is excellent, and in particular, X9R (−55° C.~175° C.) temperature characteristics may be satisfied. That is, the dielectric ceramic composition may guarantee the operation of an electronic component in high temperature environments of 175° C.

The dielectric ceramic composition according to an embodiment of the present disclosure may have permittivity of 1000 or greater at room temperature.

Since the base powder of the dielectric ceramic composition according to an embodiment of the present disclosure includes the first major component represented by $BaTiO_3$, the second major component represented by $(Na, K)NbO_3$, and the third major component represented by $(Bi, Na)TiO_3$, relatively high permittivity at room temperature may be secured and X9R (−55° C.~175° C.) temperature characteristics may be satisfied. That is, by mixing the materials having different Curie temperatures, high permittivity at room temperature may be secured and X9R (−55° C.~175° C.) temperature characteristics may be satisfied.

In certain embodiments, the first major component represented by $BaTiO_3$ has permittivity of 2000 or greater at room temperature, but has a Curie temperature of about 125° C., and thus, permittivity thereof is rapidly lowered at temperatures higher than 125° C., failing to satisfy temperature coefficient of capacitance (TCC) standards at temperatures equal to or higher than 125° C.

To solve these problems, a method of adding a relatively large amount of a rare earth element to the $BaTiO_3$ base material or performing a solid solution treatment on calcium (Ca), or a method of adding lead (Pb) to increase the Curie temperature has been attempted, but with these methods, reliability may be degraded due to the addition of the relatively large amount of minor components, and even the X8R (−55° C.~150° C.) temperature characteristics are not satisfied.

According to an embodiment of the present disclosure, the X9R (−55° C.~175° C.) temperature characteristics may be satisfied by adding the second major component represented by (Na, K)NbO$_3$ and the third major component represented by (Bi, Na)TiO$_3$, which have a significantly high Curie temperature (Tc) of about 320° C. or higher, to the first major component represented by BaTiO$_3$.

The second major component represented by (Na, K)NbO$_3$ and the third major component represented by (Bi, Na)TiO$_3$ are materials having a significantly high Curie temperature (Tc) of about 450° C. or higher, but they have a significantly low permittivity of 1000 or lower at room temperature.

According to an embodiment of the present disclosure, by including the second major component represented by (Na, K)NbO$_3$ and the third major component represented by (Bi, Na)TiO$_3$ having a significantly high Curie temperature (Tc) of about 450° C. or higher, and the first major component represented by BaTiO$_3$ having high room temperature permittivity, high permittivity at room temperature may be secured and the X9R (−55° C.~175° C.) temperature characteristics may be satisfied.

Also, the base powder of the dielectric ceramic composition may be in the form of a solid solution, in addition to the form of mixed materials having different Curie temperatures, as described above.

When the base powder is in the form of a solid solution, the base powder may have a single phase form, and it may have superior properties, such as permittivity, X9R (−55° C.~175° C.) temperature characteristics, a temperature coefficient of capacitance (TCC), and a dissipation factor, than those in the form of mixed materials.

The base powder is represented by $x$BaTiO$_3$-$y$(Na, K)NbO$_3$-$z$(Bi, Na)TiO$_3$, where $x+y+z=1$, and x, y, and z are represented by mol. Here, by adjusting x, y and z to satisfy $0.01 \leq y \leq 0.48$, and $0.02 \leq z \leq 0.2$, high permittivity at room temperature and excellent X9R (−55° C.~175° C.) temperature characteristics may be obtained.

That is, the aforementioned characteristics may be obtained in the base powder by adjusting the molar ratio (x) of the first major component represented by BaTiO$_3$ having a relatively low Curie temperature (Tc) and high permittivity at room temperature to satisfy $0.5 \leq x \leq 0.97$ and adjusting the molar ratios (y, z) of the second major component represented by (Na, K)NbO$_3$ and the third major component represented by (Bi, Na)TiO$_3$ having a relatively high Curie temperature (Tc) to satisfy $0.01 \leq y \leq 0.48$ and $0.02 \leq z \leq 0.2$, respectively.

If x is less than 0.5, the permittivity at room temperature is lowered and the dissipation factor (DF) is increased.

If x exceeds 0.97, the Curie temperature is lowered, so that it may be difficult to satisfy the X9R (−55° C.~175° C.) temperature characteristics.

If the molar ratio (y) of the second major component and the molar ratio (z) of the third major component are less than 0.01 and 0.02, respectively, the Curie temperature is decreased, so that it may be difficult to satisfy the X9R (−55° C.~175° C.) temperature characteristics.

On the other hand, if the molar ratio (y) of the second major component and the molar ratio (z) of the third major component exceed 0.48 and 0.2, respectively, since the materials having low permittivity at room temperature are excessively added, permittivity at room temperature is lowered and DF is increased.

An average particle diameter of the base powder may be 1000 nm or less, but the base powder is not limited thereto.

The base powder may be represented by $x$BaTiO$_3$-$y$(Na$_{0.5}$K$_{0.5}$)NbO$_3$-$z$(Bi$_{0.5}$Na$_{0.5}$)TiO$_3$, but the base powder is not limited thereto.

In the second major component, sodium (Na) and potassium (K) may be contained in a molar ratio of 1:1, but the second major component is not limited thereto, and sodium (Na) and potassium (K) may be contained in an amount of Na$_{0.54\pm0.1}$K$_{0.5\pm0.1}$.

Similarly, in the third major component, bismuth (Bi) and sodium (Na) may be contained in a molar ratio of 1:1, but the third major component is not limited thereto, and bismuth (Si) and sodium (Na) may be contained in an amount of Bi$_{0.5\pm0.1}$Na$_{0.5\pm0.1}$.

In general, in order to satisfy high temperature characteristics (X8R characteristics), CaZrO$_3$ and a relatively large amount of a rare earth element are added to BaTiO$_3$. In this case, however, even though high temperature characteristics may be obtained, since the Curie temperature of the base material is 125° C., there is a limitation in improving TCC.

On the other hand, the addition of the excessive amount of a rare earth element may cause the generation of a pyrochlore phase, resulting in degraded reliability.

However, the base powder of the dielectric ceramic composition according to an embodiment of the present disclosure is prepared by including the material having a high Curie temperature of 320° C. or higher and BaTiO$_3$ having a Curie temperature of 125° C. which are mixed with each other or in a solid solution state, thereby satisfying high temperature characteristics (X9R characteristics) and realizing desirable TCC characteristics.

b) First Minor Component

According to an embodiment of the present disclosure, the dielectric ceramic composition may further include an oxide or a carbonate containing at least one of manganese (Mn) vanadium (V), chromium (Cr), iron (Fe), nickel (Ni), cobalt (Co), copper (Cu), and zinc (Zn), as a first minor component. The first minor component may have a content of 0.1 mol % to 3.0 mol % on the basis of 100 mol % of the base powder.

The first minor component serves to lower a sintering temperature of a multilayer ceramic capacitor (MLCC) to which the dielectric ceramic composition is applied and to enhance high temperature withstand voltage characteristics.

The content of the first minor component and the content of a second minor component are on the basis of 100 mol % of the base powder, and may be defined by mol % of metal ions included in each of the minor components.

If the content of the first minor component is lower than 0.1 mol %, insulation resistance does not reach a target level, and thus, room temperature resistivity may be degraded. If the content of the first minor component exceeds 3.0 mol %, room temperature permittivity is lowered to be less than 1000.

In certain embodiments, because the dielectric ceramic composition further includes the first minor component of 0.1 mol % to 3.0 mol % on the basis of 100 mol % of the base powder, the dielectric ceramic composition may be sintered at low temperatures and obtain high temperature withstand voltage characteristics.

c) Second Minor Component

According to an embodiment of the present disclosure, the dielectric ceramic composition further includes an oxide including silicon (Si) or a glass compound including silicon (Si), as a second minor component. The second minor component may have a content of 0.2 mol % to 10.0 mol %, on the basis of 100 mol % of the base powder.

The second minor component serves to lower a sintering temperature of an MLCC to which the dielectric ceramic composition is applied and to enhance high temperature withstand voltage characteristics. If the content of the second minor component is lower than 0.2 mol % on the basis of 100 mol % of the base powder, sintering density may be low and insulation resistance may not reach a target level, and thus, room temperature resistivity may be degraded. If the content of the second minor component exceeds 10.0 mol % on the basis of 100 mol % of the base powder, room temperature permittivity is lowered to be less than 1000.

In certain embodiments, because the dielectric ceramic composition according to an embodiment of the present disclosure further includes the second minor component of 0.2 mol % to 10.0 mol % on the basis of 100 mol % of the base powder, the dielectric ceramic composition may be sintered at low temperatures and obtain high temperature withstand voltage characteristics.

FIG. 1 is a graph illustrating composition regions of major components of the base powder represented by $xBaTiO_3$-y$(Na_{0.5}K_{0.5})NbO_3$-z$(Bi_{0.5}Na_{0.5})TiO_3$.

Referring to FIG. 1, composition areas of the first major component represented by $BaTiO_3$ having a Curie temperature of 125° C. able to secure high permittivity at room temperature and satisfy X9R (−55° C.~175° C.) characteristics, and the second major component represented by (Na, K)$NbO_3$ and the third major component represented by (Bi, Na) $TiO_3$ having a Curie temperature of 450° C. or higher are illustrated.

In FIG. 1, points indicated by x, among points, represent comparative examples in which target characteristics are not obtained, and the other points represent inventive examples in which target characteristics are obtained.

A composition range of the major components included in the dielectric ceramic composition of which the target characteristics are obtained, according to an embodiment of the present disclosure, is represented by the shaded region.

Thus, an MLCC employing the dielectric ceramic composition according to certain embodiments of the present disclosure satisfy high temperature characteristics (X9R characteristics) and realize desirable TCC characteristics.

Figure 2:
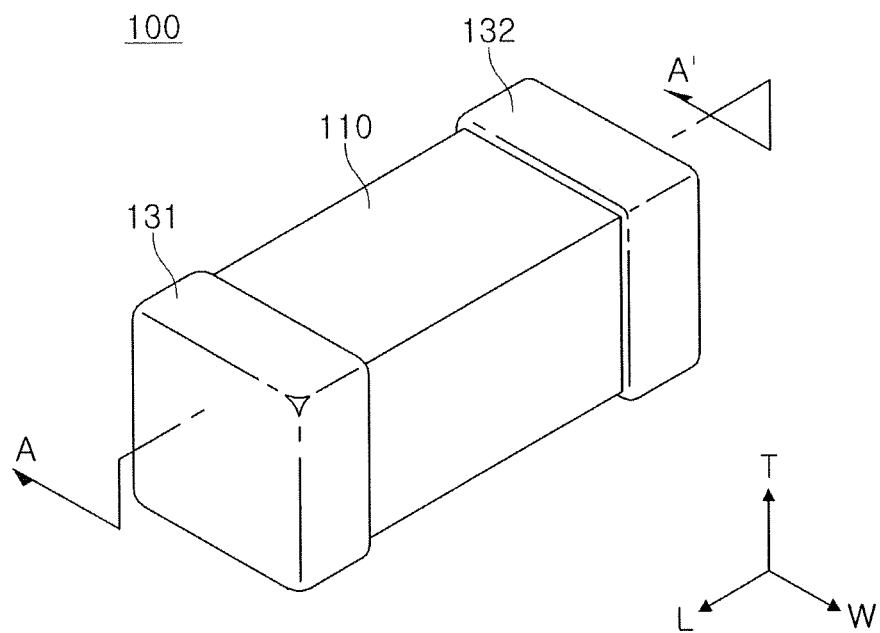
FIG. 2 is a perspective view schematically illustrating a multilayer ceramic capacitor (MLCC) according to an embodiment of the present disclosure.
Figure 3:
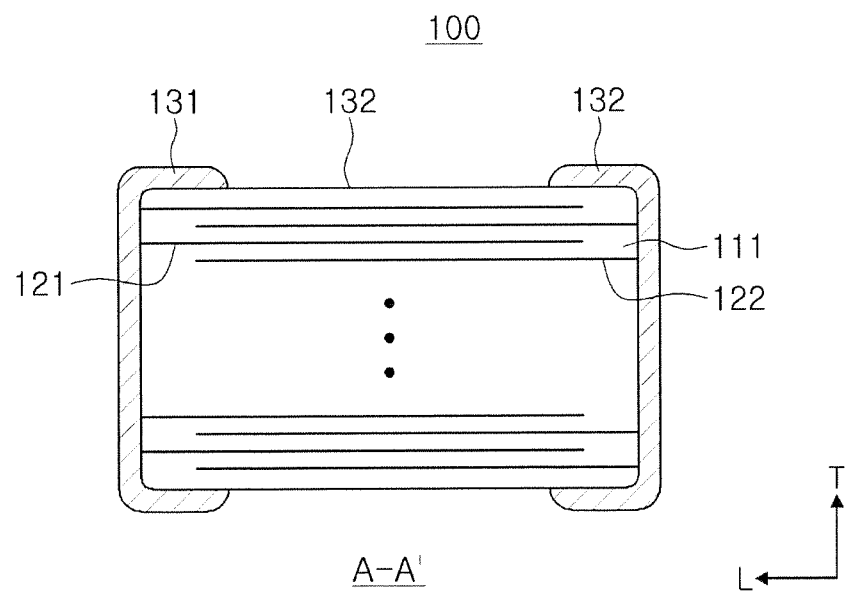
FIG. 3 is a cross-sectional view schematically illustrating the MLCC taken along line A-A' of FIG. 2.

FIG. 2 is a perspective view schematically illustrating a multilayer ceramic capacitor (MLCC) according to an embodiment of the present disclosure, and FIG. 3 is a cross-sectional view schematically illustrating the MLCC taken along line A-A' of FIG. 2.

Referring to FIGS. 2 and 3, an MLCC 100 according to this embodiment has a ceramic body 110 in which dielectric layers 111 and first and second internal electrodes 121 and 122 are alternately stacked. First and second external electrodes 131 and 132 are formed on both end portions of the ceramic body 110 and electrically connected to the first and second internal electrodes which are alternately disposed within the ceramic body 110.

The shape of the ceramic body 110 is not particularly limited, but, generally, the ceramic body 110 has a hexahedral shape. Also, dimensions thereof are not particularly limited, and the ceramic body 110 may have appropriate dimensions according to purposes thereof. For example, the dimensions of the ceramic body 110 may be (0.6 to 5.6 mm)×(0.3 to 5.0 mm)×(0.3 to 1.9 mm).

A thickness of the dielectric layers 111 may be changed according to a desired level of capacitance in a capacitor. In an embodiment of the present disclosure, the thickness of the dielectric layer, after sintering, is 0.1 μm or greater per layer.

If the dielectric layers are excessively thin, the number of crystal grains present in a single layer may be so low that reliability may be negatively affected, and thus, the thickness of the dielectric layer may be 0.1 μm or greater.

The first and second internal electrodes 121 and 122 are stacked such that ends thereof are alternately exposed to opposing end portions of the ceramic body 110.

The first and second external electrodes 131 and 132 are formed on the opposing end portions of the ceramic body 110 and electrically connected to the exposed ends of the alternately disposed first and second internal electrodes 121 and 122 to form a capacitor circuit.

A conductive material contained in the first and second internal electrodes 121 and 122 is not particularly limited; however, since a material for the dielectric layers according to an embodiment of the present disclosure is in the form of a mixture of a paraelectric material and a ferroelectric material or in the form of a solid solution, nickel (Ni) may be used.

A thickness of the first and second internal electrodes 121 and 122 may be appropriately determined according to purposes, or the like, and is not particularly limited. For example, the thickness of the first and second internal electrodes 121 and 122 may range from 0.1 μm to 5 μm or from 0.1 μm to 2.5 μm.

A conductive material contained in the first and second external electrodes 131 and 132 is not particularly limited, and nickel (Ni), copper (Cu), or an alloy thereof may be used.

A thickness of the first and second external electrodes 131 and 132 may be appropriately determined according to purposes, or the like, and is not particularly limited. For example, the thickness of the first and second external electrodes 131 and 132 may range from 10 μm to 50 μm.

The dielectric layers 111 forming the ceramic body 110 includes a dielectric ceramic composition according to an embodiment of the present disclosure.

The dielectric ceramic composition according to an embodiment includes a base powder including a first major component represented by $BaTiO_3$, a second major component represented by (Na, K)$NbO_3$, and a third major component represented by (Bi, Na)$TiO_3$.

The base powder is represented by $xBaTiO_3$-y(Na, K)$NbO_3$-z(Bi, Na)$TiO_3$, where x+y+z=1, and x, y, and z are represented by mol. Here, x, y and z may satisfy 0.5≤x≤0.97, 0.01≤y≤0.48, and 0.02≤z≤0.2, respectively, and in particular, the base powder may be represented by $xBaTiO_3$-y$(Na_{0.5}K_{0.5})NbO_3$-z$(Bi_{0.5}Na_{0.5})TiO_3$.

Characteristics of the dielectric ceramic composition according to this embodiment are the same as those of the dielectric ceramic composition according to the previous embodiment of the present disclosure described above, and thus, a detailed description thereof will be omitted.

In certain embodiments of the disclosure, a dielectric ceramic composition is provided comprising a base powder. The base powder comprises: a first major component X having a Curie temperature of about 125° C., a second major component Y having a Curie temperature of about 450° C. or higher, and a third major component Z having a Curie temperature of about 320° C. or higher.

In certain embodiments, the base powder is represented by xX-yY-zZ, where x+y+z=1; x, y, and z are represented by mol; and X and Z are titanates and Y is a niobate.

Hereinafter, the present disclosure will be described in more detail through inventive and comparative examples. This is to help in an understanding of the present disclosure, and the scope of the present disclosure should not be construed as being limited to the embodiment set forth hereinafter.

A raw material (a base powder) included $xBaTiO_3$-$y$ $(Na_{0.5}K_{0.5})NbO_3$-$z(Bi_{0.5}Na_{0.5})TiO_3$ as a major component, and the powder was prepared by using a solid state method.

Starting raw materials were $BaCO_3$, $TiO_2$, $Na_2O$, $K_2O$, $Bi_2O_3$, and $Nb_2O_5$.

First, $BaCO_3$ and $TiO_2$ were mixed by ball milling and calcined in a temperature range of 900° C. to 1000° C. to prepare a $BaTiO_3$ powder having an average particle size of 300 nm.

In a similar manner, $TiO_2$, $Na_2O$, $K_2O$, $Bi_2O_3$, and $Nb_2O_5$ were mixed by ball milling and calcined in a temperature range of 800° C. to 900° C. to prepare $(Na_{0.5}K_{0.5})NbO_3$ and $(Bi_{0.5}Na_{0.5})TiO_3$ powders having an average particle size of 300 nm.

The synthesized $BaTiO_3$, $(Na_{0.5}K_{0.5})NbO_3$ and $(Bi_{0.5}Na_{0.5})TiO_3$ powders were weighed according to the composition ratios described in Table 1, glass frit or a sintering aid including additives (minor component) $MnO_2$ and $SiO_2$ was added according to the composition ratios specified in Table 1 and Table 3, the base powder including the major component and the minor component was mixed by using a zirconia ball as a dispersing media, and was mixed with ethanol/toluene, a dispersing agent, and a binder, and subsequently ball-milled for 20 hours.

The prepared slurry was formed as sheets having a thickness of 5.0 μm and sheets having a thickness of about 10 μm to 13 μm by using a small doctor blade-type coater.

Nickel (Ni) internal electrodes were printed on the sheets having a thickness of 5.0 μm.

As upper and lower cover layers, the sheets having a thickness of 10 μm to 13 μm were stacked to form 25 layers, and the sheets having the internal electrodes of about 2.0 μm printed thereon were stacked to form 21 layers to manufacture an active part in a bar shape.

The compressed bar was cut into 3216-sized electronic components (length×width×thickness=3.2 mm×1.6 mm×1.6 mm) using a cutter.

The completed electronic component was plasticized, sintered at a temperature ranging from 1150° C. to 1200° C. under a reduction atmosphere (1% $H_2$/99% $N_2$, $H_2O/H_2/N_2$ atmosphere) for two hours, and re-oxidized at 1000° C. under a nitrogen ($N_2$) atmosphere for three hours to perform a heat treatment.

A copper (Cu) paste was applied to the sintered electronic component and sintered to form external electrodes.

A proto-type sample, MLCC which was manufactured using the above-described method was evaluated in view of capacitance, DF, insulation resistance, TCC, and resistance degradation behavior depending on an increase in voltage levels at a high temperature of 150° C.

Room temperature capacitance and DF of the MLCC were measured using an LCR-meter under conditions of 1 kHz and AC 0.2 V/μm.

A dielectric constant of the MLCC was calculated from the capacitance of the MLCC and the thickness of the dielectric layer, an area of the internal electrodes, and the number of stacked layers in the MLCC.

Ten samples were selected, and room temperature insulation resistance (IR) of each sample was measured after DC 10 V/μm was applied thereto for 60 seconds.

TCC was measured depending on temperature changes within a temperature range of −55° C. to 175° C.

In a high temperature IR voltage-boost test, resistance degradation behavior was measured by increasing a voltage level of 5 V/μm per each step at 150° C., wherein each step lasted 10 minutes and resistance values were measured at 5-second intervals.

High temperature withstand voltage was obtained from the high temperature IR voltage-boost test, wherein the withstand voltage refers to a maximum voltage allowing IR to be maintained at $10^5 \Omega$ or more when a DC voltage level of 5 V/μm was applied to the 3216-sized electronic component including 20 dielectric layers having a thickness of 7 μm after being sintered, at 150° C. for 10 minutes, and was then continuously increased by 5 V/μm per each step.

TABLE 1

| | Molar Ratio of Components of Base Material $xBaTiO_3$—$y(Na_{0.5}K_{0.5})NbO_3$—$z(Bi_{0.5}Na_{0.5})TiO_3$ | | | Mol % of Minor Components per 100 mol % of Base Material | | |
|---|---|---|---|---|---|---|
| | First Major Component $BaTiO_3$ | Second Major Component $(Na_{0.5}K_{0.5})NbO_3$ | Third Major Component $(Bi_{0.5}Na_{0.5})TiO_3$ | First Minor Component | | Second Minor Component |
| | (x) | (y) | (z) | $MnO_2$ | $V_2O_5$ | $SiO_2$ |
| *1 | 0.50 | 0.50 | 0.00 | 0.500 | 0.000 | 1.00 |
| *2 | 0.70 | 0.30 | 0.00 | 0.500 | 0.000 | 1.00 |
| *3 | 0.99 | 0.01 | 0.00 | 0.500 | 0.000 | 1.00 |
| *4 | 0.45 | 0.53 | 0.02 | 0.500 | 0.000 | 1.00 |
| 5 | 0.50 | 0.48 | 0.02 | 0.500 | 0.000 | 1.00 |
| 6 | 0.60 | 0.38 | 0.02 | 0.500 | 0.000 | 1.00 |
| 7 | 0.70 | 0.28 | 0.02 | 0.500 | 0.000 | 1.00 |
| 8 | 0.80 | 0.18 | 0.02 | 0.500 | 0.000 | 1.00 |
| 9 | 0.90 | 0.08 | 0.02 | 0.500 | 0.000 | 1.00 |
| 10 | 0.97 | 0.01 | 0.02 | 0.500 | 0.000 | 1.00 |
| *11 | 0.98 | 0.00 | 0.02 | 0.500 | 0.000 | 1.00 |
| 12 | 0.50 | 0.40 | 0.10 | 0.500 | 0.000 | 1.00 |
| 13 | 0.70 | 0.20 | 0.10 | 0.500 | 0.000 | 1.00 |
| 14 | 0.89 | 0.01 | 0.10 | 0.500 | 0.000 | 1.00 |
| *15 | 0.90 | 0.00 | 0.10 | 0.500 | 0.000 | 1.00 |
| *16 | 0.45 | 0.35 | 0.20 | 0.500 | 0.000 | 1.00 |
| 17 | 0.50 | 0.30 | 0.20 | 0.500 | 0.000 | 1.00 |
| 18 | 0.60 | 0.20 | 0.20 | 0.500 | 0.000 | 1.00 |
| 19 | 0.70 | 0.10 | 0.20 | 0.500 | 0.000 | 1.00 |
| 20 | 0.79 | 0.01 | 0.20 | 0.500 | 0.000 | 1.00 |

TABLE 1-continued

| | Molar Ratio of Components of Base Material $x$BaTiO$_3$—$y$(Na$_{0.5}$K$_{0.5}$)NbO$_3$—$z$(Bi$_{0.5}$Na$_{0.5}$)TiO$_3$ | | | Mol % of Minor Components per 100 mol % of Base Material | | |
|---|---|---|---|---|---|---|
| | First Major Component BaTiO$_3$ | Second Major Component (Na$_{0.5}$K$_{0.5}$)NbO$_3$ | Third Major Component (Bi$_{0.5}$Na$_{0.5}$)TiO$_3$ | First Minor Component | | Second Minor Component |
| | (x) | (y) | (z) | MnO$_2$ | V$_2$O$_5$ | SiO$_2$ |
| *21 | 0.80 | 0.00 | 0.20 | 0.500 | 0.000 | 1.00 |
| *22 | 0.50 | 0.25 | 0.25 | 0.500 | 0.000 | 1.00 |
| *23 | 0.60 | 0.15 | 0.25 | 0.500 | 0.000 | 1.00 |
| *24 | 0.74 | 0.01 | 0.25 | 0.500 | 0.000 | 1.00 |
| *25 | 0.75 | 0.00 | 0.25 | 0.500 | 0.000 | 1.00 |
| *26 | 0.70 | 0.00 | 0.30 | 0.500 | 0.000 | 1.00 |

*Comparative Example

Table 2 shows the characteristics of the prototype MLCCs corresponding to the composition specified in Table 1.

TABLE 2

| Sample | Room Temperature Permittivity | DF (%) | Room Temperature Resistivity (Ω-cm) | TCC (%) (−55° C.) | TCC (%) (150° C.) | TCC (%) (175° C.) | High Temperature Withstand Voltage (150° C.) (V/μm) | Determination |
|---|---|---|---|---|---|---|---|---|
| *1 | 1204 | 2.80 | 7.560E+12 | 5.8 | −13.6 | −16.7 | 55.0 | x |
| *2 | 1821 | 3.38 | 8.120E+12 | 12.4 | −12.8 | −17.4 | 55.0 | x |
| *3 | 3548 | 6.50 | 1.040E+13 | −8.4 | −11.6 | −20.6 | 55.0 | x |
| *4 | 887 | 2.38 | 5.640E+12 | −12.6 | −6.7 | −11.3 | 55.0 | x |
| 5 | 1024 | 3.40 | 5.890E+12 | −12.1 | −10.7 | −11.8 | 55.0 | ○ |
| 6 | 1132 | 3.50 | 6.320E+12 | −11.9 | −10.5 | −12.5 | 55.0 | ○ |
| 7 | 1268 | 3.30 | 7.110E+12 | −12.0 | −9.8 | −12.8 | 55.0 | ○ |
| 8 | 1347 | 3.69 | 8.040E+12 | −12.5 | −9.7 | −13.5 | 55.0 | ○ |
| 9 | 1459 | 4.12 | 8.550E+12 | −13.1 | −8.4 | −14.5 | 60.0 | ○ |
| 10 | 1926 | 4.62 | 8.810E+12 | −12.4 | −7.8 | −14.8 | 60.0 | ○ |
| *11 | 2246 | 5.86 | 1.034E+13 | −13.5 | −7.7 | −19.8 | 60.0 | x |
| 12 | 1277 | 4.12 | 4.560E+12 | −14.8 | −7.4 | −12.8 | 55.0 | ○ |
| 13 | 1569 | 4.44 | 4.680E+12 | −13.5 | −8.1 | −13.1 | 55.0 | ○ |
| 14 | 2014 | 4.58 | 4.320E+12 | −11.4 | −9.8 | −14.4 | 55.0 | ○ |
| *15 | 2117 | 5.47 | 5.550E+12 | −12.2 | −12.5 | −16.7 | 55.0 | x |
| *16 | 785 | 2.11 | 3.680E+12 | −11.8 | −7.5 | −11.7 | 50.0 | x |
| 17 | 1148 | 2.46 | 3.634E+13 | −12.8 | −7.7 | −12.4 | 50.0 | ○ |
| 18 | 1256 | 2.51 | 3.710E+12 | −13.2 | −8.2 | −13.2 | 50.0 | ○ |
| 19 | 1472 | 2.87 | 3.110E+12 | −13.8 | −8.5 | −13.7 | 50.0 | ○ |
| 20 | 1745 | 3.02 | 3.060E+12 | −11.5 | −10.4 | −14.1 | 50.0 | ○ |
| *21 | 1964 | 3.54 | 3.260E+12 | −11.8 | −11.1 | −15.9 | 55.0 | x |
| *22 | 1167 | 2.31 | 4.180E+10 | −12.5 | −7.8 | −12.4 | 40.0 | x |
| *23 | 1387 | 2.45 | 3.250E+10 | −12.4 | −7.4 | −12.8 | 35.0 | x |
| *24 | 1682 | 2.93 | 3.670E+10 | −12.7 | −7.5 | −13.3 | 35.0 | x |
| *25 | 1746 | 3.12 | 3.670E+10 | −12.7 | −8.5 | −14.5 | 35.0 | x |
| *26 | 1555 | 2.88 | 2.840E+10 | −12.7 | −8.4 | −16.5 | 35.0 | x |

*Comparative Example

Referring to Table 1 and Table 2, Comparative Examples 1 to 3 show characteristics of prototype MLCCs according to changes in the content x of the first major component and the content y of the second major component, when the content of the first minor component MnO$_2$ and the content of the second minor component SiO$_2$ were 0.5 mol % and 1.0 mol %, respectively, and the content z of the third major component (Bi$_{0.5}$Na$_{0.5}$)TiO$_3$ was 0, compared with the base powder $x$BaTiO$_3$-$y$(Na$_{0.5}$K$_{0.5}$)NbO$_3$-$z$(Bi$_{0.5}$Na$_{0.5}$)TiO$_3$ (where x+y+z=1 and x, y, z are represented by mol).

It can be seen that Comparative Examples 1 to 3 did not satisfy X9R temperature characteristics in which TCC (175° C.) was within ±15% when the content x had a large range of 0.5 to 0.99.

Comparative Example 4, Inventive Examples 5 to 10, and Comparative Example 11 of Table 1 show variations in the content x of the first major component and the content y of the second major component, when the content of the first minor component MnO$_2$ and the content of the second minor component SiO$_2$ were 0.5 mol % and 1.0 mol %, respectively, and the content z of the third major component (Bi$_{0.5}$Na$_{0.5}$)TiO$_3$ was 0.02, compared with the base powder $x$BaTiO$_3$-$y$(Na$_{0.5}$K$_{0.5}$)NbO$_3$-$z$(Bi$_{0.5}$Na$_{0.5}$)TiO$_3$ (where x+y+z=1 and x, y, z are represented by mol), and Table 2 shows characteristics of the prototype MLCCs according to these Comparative and Inventive Examples.

It can be seen that, when the content x was 0.45, significantly low, (Comparative Example 4), permittivity was less than 1000, and when the content x was 0.98, significantly high, (Comparative Example 11), permittivity was 2000 or greater and TCC (175° C.) was −19.8%, outside of X9R characteristics.

In the compositions in which the content x was within the range of 0.5 to 0.97 (Inventive Examples 5 to 10), all of the target characteristics including permittivity of 1000 or greater, TCC (175° C.) lower than ±15%, and high temperature withstand voltage of 50 V/μm were obtained.

Inventive Examples 12 to 14 and Comparative Example 15 of Table 1 show variations in the content x of the first major component and the content y of the second major component, when the content of the first minor component $MnO_2$ and the content of the second minor component $SiO_2$ were 0.5 mol % and 1.0 mol %, respectively, and the content z of the third major component $(Bi_{0.5}Na_{0.5})TiO_3$ was 0.1, compared with the base powder $xBaTiO_3$-$y(Na_{0.5}K_{0.4})NbO_3$-$z(Bi_{0.5}Na_{0.5})TiO_3$ (where x+y+z=1 and x, y, z are represented by mol), and Table 2 shows characteristics of the prototype MLCCs according to these Examples.

It can be seen that, when the content x ranged from 0.5 to 0.89 (Inventive Examples 12 to 14), all of the target characteristics were satisfied.

It can be seen that, when the content x was 0.90, very high, (Comparative Example 15), permittivity was 2177 and TCC (175° C.) was −16.7%, outside of X9R characteristics.

Comparative Example 16, Inventive Examples 17 to 20, and Comparative Example 21 of Table 1 show variations in the content x of the first major component and the content y of the second major component, when the content of the first minor component $MnO_2$ and the content of the second minor component $SiO_2$ were 0.5 mol % and 1.0 mol %, respectively, and the content z of the third major component $(Bi_{0.5}Na_{0.5})TiO_3$ was 0.2, compared with the base powder $xBaTiO_3$-$y(Na_{0.5}K_{0.5})NbO_3$-$z(Bi_{0.5}Na_{0.5})TiO_3$ (where x+y+z=1 and x, y, z are represented by mol), and Table 2 shows characteristics of the prototype MLCCs according to these Examples.

It can be seen that, when the content x was 0.45, very low, (Comparative Example 16), permittivity was less than 1000, and when the content x was 0.80, excessively high, (Comparative Example 21), permittivity was 1900 or greater and TCC (175° C.) was −15.9%, outside of X9R characteristics.

When the content x ranged from 0.5 to 0.79 (Inventive Examples 17 to 20), all of the target characteristics were satisfied.

Comparative Examples 22 to 25 of Table 1 show variations in the content x of the first major component and the content y of the second major component, when the content of the first minor component $MnO_2$ and the content of the second minor component $SiO_2$ were 0.5 mol % and 1.0 mol %, respectively, and the content z of the third major component $(Bi_{0.5}Na_{0.5})TiO_3$ was 0.25, compared with the base powder $xBaTiO_3$-$y(Na_{0.5}K_{0.5})NbO_3$-$z(Bi_{0.5}Na_{0.5})TiO_3$ (where x+y+z=1 and x, y, z are represented by mol), and Table 2 shows characteristics of the prototype MLCCs according to these Examples.

When the content z was 0.25, excessively high, the high temperature withstand voltage characteristics were lower than 40 V/μm, regardless of the content x, and thus, the target characteristics were not satisfied.

Comparative Examples 11, 15, 21, 25, and 26 show variations in the content x of the first major component and the content z of the third major component when the content of the first minor component $MnO_2$ and the content of the second minor component $SiO_2$ were 0.5 mol % and 1.0 mol %, respectively, and the content y of the second major component $(Na_{0.5}K_{0.5})NbO_3$ was 0, compared with the base powder $xBaTiO_3$-$y(Na_{0.5}K_{0.5})NbO_3$-$z(Bi_{0.5}Na_{0.5})TiO_3$ (where x+y+z=1 and x, y, z are represented by mol), and Table 2 shows characteristics of the prototype MLCCs according to these Examples.

When the content y of the second major component $(Na_{0.5}K_{0.5})NbO_3$ in Examples 11, 15, 21, and 26 was 0, TCC (175° C.) was out of ±15.0%, regardless of the content x, and thus, the X9R characteristics were not satisfied.

The results of Inventive and Comparative Examples are shown as in FIG. 1. Points indicated by x represent the Comparative Examples in which the target characteristics are not obtained, and the other points represent the Inventive Examples in which the target characteristics are obtained. Thus, it can be seen that the composition range of the major components for the target characteristics is defined by the shaded region.

TABLE 3

| | Molar Ratio of Components of Base Material $x\text{BaTiO}_3$—$y(\text{Na}_{0.5}\text{K}_{0.5})\text{NbO}_3$—$z(\text{Bi}_{0.5}\text{Na}_{0.5})\text{TiO}_3$ | | | Mol % of Minor Components per 100 mol % of Base Material | | |
|---|---|---|---|---|---|---|
| | First Major Component $\text{BaTiO}_3$ | Second Major Component $(\text{Na}_{0.5}\text{K}_{0.5})\text{NbO}_3$ | Third Major Component $(\text{Bi}_{0.5}\text{Na}_{0.5})\text{TiO}_2$ | First Minor Component | | Second Minor Component |
| | (x) | (y) | (z) | $MnO_2$ | $V_2O_5$ | $SiO_2$ |
| *27 | 0.89 | 0.01 | 0.10 | 0.000 | 0.000 | 1.00 |
| 28 | 0.89 | 0.01 | 0.10 | 0.100 | 0.000 | 1.00 |
| 29 | 0.89 | 0.01 | 0.10 | 0.300 | 0.000 | 1.00 |
| 30 | 0.89 | 0.01 | 0.10 | 1.000 | 0.000 | 1.00 |
| 31 | 0.89 | 0.01 | 0.10 | 3.000 | 0.000 | 1.00 |
| *32 | 0.89 | 0.01 | 0.10 | 4.000 | 0.000 | 1.00 |
| 33 | 0.89 | 0.01 | 0.10 | 0.500 | 0.250 | 1.00 |
| 34 | 0.89 | 0.01 | 0.10 | 1.500 | 0.750 | 1.00 |
| *35 | 0.89 | 0.01 | 0.10 | 2.000 | 1.000 | 1.00 |
| *36 | 0.89 | 0.01 | 0.10 | 0.500 | 0.000 | 0.00 |
| 37 | 0.89 | 0.01 | 0.10 | 0.500 | 0.000 | 0.20 |
| 38 | 0.89 | 0.01 | 0.10 | 0.500 | 0.000 | 5.00 |
| 39 | 0.89 | 0.01 | 0.10 | 0.500 | 0.000 | 10.00 |
| *40 | 0.89 | 0.01 | 0.10 | 0.500 | 0.000 | 15.00 |

*Comparative Example

Table 4 shows characteristics of prototype MLCCs corresponding to the compositions specified in Table 4.

TABLE 4

| Sample | Room Temperature Permittivity | DF (%) | Room Temperature Resistivity (Ω-cm) | TCC (%) (−55° C.) | TCC (%) (150° C.) | TCC (%) (175° C.) | High Temperature Withstand Voltage (150° C.) (v/μm) | Determination |
|---|---|---|---|---|---|---|---|---|
| *27 | 16848 | 423.50 | 6.540E+8 | — | — | — | — | x |
| 28 | 2124 | 4.78 | 3.860E+12 | −12.5 | −8.8 | −14.7 | 55.0 | ○ |
| 29 | 2112 | 4.62 | 4.320E+13 | −11.4 | −9.8 | −14.4 | 55.0 | ○ |
| 30 | 1642 | 3.35 | 5.580E+12 | −13.5 | −7.6 | −13.7 | 55.0 | ○ |
| 31 | 1202 | 2.78 | 2.560E+12 | −13.6 | −7.4 | −12.8 | 55.0 | ○ |
| *32 | 884 | 1.88 | 5.390E+12 | −13.2 | −7.5 | −12.2 | 55.0 | x |
| 33 | 1604 | 3.27 | 6.874E+12 | −12.8 | −7.6 | −13.1 | 55.0 | ○ |
| 34 | 1210 | 3.59 | 3.240E+12 | −13.2 | −7.4 | −12.5 | 55.0 | ○ |
| *35 | 862 | 1.78 | 5.390E+12 | −13.2 | −7.5 | −14.7 | 60.0 | x |
| *36 | 1846 | 3.02 | 7.420E+10 | −14.2 | −10.2 | −10.2 | 60.0 | x |
| 37 | 1974 | 3.35 | 3.890E+13 | −12.1 | −9.9 | −9.9 | 60.0 | ○ |
| 38 | 1842 | 2.88 | 4.680E+12 | −12.8 | −8.7 | −8.7 | 55.0 | ○ |
| 39 | 1526 | 2.45 | 5.890E+12 | −11.6 | −7.4 | −7.4 | 55.0 | ○ |
| *40 | 994 | 2.25 | 7.690E+12 | −11.8 | −7.1 | −7.1 | 55.0 | x |

*Comparative Example

Comparative Example 27, Inventive Examples 28 to 31, and Comparative Example 32 of Table 3 show experimental examples according to changes in the content of the first minor component $MnO_2$ when the contents of the major components of the base powder $xBaTiO_3$-$y(Na_{0.5}K_{0.5})NbO_3$-$z(Bi_{0.5}Na_{0.5})TiO_3$ (where $x+y+z=1$ and $x$, $y$, $z$ are represented by mol) were $x=0.89$, $y=0.01$, $z=0.10$, respectively, and the content of the second minor component $SiO_2$ was 1.0 mol %, and Table 4 show characteristics of the prototype MLCCs according to these experimental examples.

When the first minor component was not added (Comparative Example 27), insulation resistance was not sufficient, and thus, room temperature resistivity was lowered to be less than 6.540E+8 Ohm-cm. On the other hand, when the content of the first minor component $MnO_2$ was 4.0 mol %, excessively high, (Comparative Example 32), room temperature permittivity was lowered to be less than 1000. When the content of the first minor component $MnO_2$ ranged from 0.1 mol % to 3.0 mol % (Inventive Examples 28 to 31), the target characteristics were obtained.

Inventive Examples 33 to 34 and Comparative Example 35 of Table 3 show experimental examples when a portion of the first minor component $MnO_2$ was changed to $V_2O_5$. When the overall content of the first minor component was the same in relation to mol %, the characteristics of Mn alone and the characteristics of a combination of Mn and V were substantially the same (Inventive Examples 30 and 33 or Inventive Examples 31 and 34). When the overall content of the first minor component was 4 mol %, slightly excessive (Comparative Example 35), room temperature permittivity was lowered to be less than 1000, as in the case in which Mn alone was added (Comparative Example 32).

Comparative Example 36, Inventive Examples 37 to 39, and Comparative Example 40 of Table 3 show experimental examples according to changes in the content of the second minor component $SiO_2$ when the contents of the major components of the base powder $xBaTiO_3$-$y(Na_{0.5}K_{0.5})NbO_3$-$z(Bi_{0.5}Na_{0.5})TiO_3$ (where $x+y+z=1$ and $x$, $y$, $z$ are represented by mol) were $x=0.89$, $y=0.01$, $z=0.10$, respectively, and the content of the first minor component $MnO_2$ was 0.5 mol %, and Table 2 show characteristics of the prototype MLCCs according to these experimental examples.

When the second minor component was not added (Comparative Example 36), sintering density was low and insulation resistance was not sufficient, and thus, room temperature resistivity was lowered to be 7.420E+10 Ohm-cm, and when the content of the second minor component was 15.0 mol %, excessively high (Comparative Example 40), room temperature permittivity was lowered to be less than 1000. It can be seen that, when the content of the second minor component ranged from 0.2 mol % to 10.0 mol % (Inventive Examples 37 to 39), the target characteristics were obtained.

In a certain embodiment, the dielectric layers include a dielectric ceramic composition comprising a first major component X having a Curie temperature of about 125° C., a second major component Y having a Curie temperature of about 320° C. or higher, and a third major component Z having a Curie temperature of about 450° C. or higher. The multilayer ceramic capacitor has: a temperature coefficient of capacitance of within +/−15% in a temperature range of −55° C. to 175° C., a room temperature permittivity of greater than 1000, a withstand voltage of at least 50 V/μm at 150° C., and a room temperature resistivity of greater than 7.420E+10.

As set forth above, in a dielectric ceramic composition and an MLCC including the same according to exemplary embodiments of the present disclosure, since the Curie temperature of the base powder is increased and permittivity at high temperature becomes smooth, relatively high permittivity of 1000 or greater at room temperature may be obtained and satisfactory high temperature withstand voltage characteristics and X9R temperature characteristics may be obtained.

While exemplary embodiments have been shown and described above, it will be apparent to those skilled in the art that modifications and variations could be made without departing from the spirit and scope of the present disclosure as defined by the appended claims.

What is claimed is:

1. A dielectric ceramic composition comprising a base powder, wherein the base powder is represented by $xBaTiO_3$-$y(Na_a, K_b)NbO_3$-$z(Bi_c, Na_d)TiO_3$, where a+b=1; c+d=1; and x+y+=1, and x, y, and z are represented by mol, and x, y, and z satisfy 0.5<x<0.97, 0.01<y<0.48, and 0.02<z<0.2 respectively, wherein a, b, c and d are within a range from 0.4 to 0.6.

2. The dielectric ceramic composition of claim 1, wherein the base powder is represented by $xBaTiO_3$-$y(Na_{0.5}K_{0.5})NbO_3$-$z(Bi_{0.5}Na_{0.5})TiO_3$.

3. The dielectric ceramic composition of claim 1, further comprising 0.1 mol % to 3.0 mol % of a first minor component on the basis of 100 mol % of the base powder, wherein the first minor component includes an oxide or a carbonate containing at least one of manganese (Mn), vanadium (V), chromium (Cr), iron (Fe), nickel (Ni), cobalt (Co), copper (Cu), and zinc (Zn).

4. The dielectric ceramic composition of claim 1, further comprising 0.2 mol % to 10.0 mol % of a second minor component on the basis of 100 mol % of the base powder, wherein the second minor component includes an oxide including silicon (Si) or a glass compound including silicon (Si).

5. The dielectric ceramic composition of claim 1, wherein the base powder is in the form of a solid solution.

6. A dielectric ceramic composition comprising a base powder, wherein the base powder comprises:

a first major component X having a Curie temperature of about 125° C.;

a second major component Y having a Curie temperature of about 450° C. or higher; and a third major component Z having a Curie temperature of about 320° C. or higher, wherein the base powder is represented by xX-yY-zZ, where x+y+z=1, and x, y, and z are represented by mol, and X and Z are titanates and Y is a niobate, and wherein x, y, and z satisfy 0.5<x<0.97, 0.01<y<0.48, and 0.02<z<0.2, respectively, and X is $BaTiO_3$, Y is $(Na_a, K_b)NbO_3$, and Z is $(Bi_c, Na_d)TiO_3$, where a+b=1, c+d=1, wherein a, b, c and d are within a range from 0.4 to 0.6.

7. The dielectric ceramic composition of claim 6, further comprising 0.1 mol % to 3.0 mol % of a first minor component on the basis of 100 mol % of the base powder, wherein the first minor component includes an oxide or a carbonate containing at least one of manganese (Mn), vanadium (V), chromium (Cr), iron (Fe), nickel (Ni), cobalt (Co), copper (Cu), and zinc (Zn).

8. The dielectric ceramic composition of claim 1, wherein the base powder is formed by mixing $BaTiO_3$, $(Na_{0.5}K_{0.5})NbO_3$, and $(Na_{0.5}K_{0.5})TiO_3$ which are synthesized by using a solid state method.

9. The dielectric ceramic composition of claim 6, wherein the base powder is formed by mixing $BaTiO_3$, $(Na_{0.5}K_{0.5})NbO_3$, and $(Na_{0.5}K_{0.5})TiO_3$ which are synthesized by using a solid state method.

* * * * *